United States Patent

[11] 3,549,001

[72] Inventors Gerald L. Harper;
 Wesley J. Bachman, Eureka, Ill.
[21] Appl. No. 763,808
[22] Filed Sept. 30, 1968
[45] Patented Dec. 22, 1970
[73] Assignee Advanced Systems, Inc.
 Eureka, Ill.
 a corporation of Illinois

[54] FEED CONVEYOR
 14 Claims, 3 Drawing Figs.
[52] U.S. Cl. .................................................. 198/66,
 119/56; 198/155, 198/158
[51] Int. Cl. ...................................................... B65g 47/44,
 B65g 47/46
[50] Field of Search........................................ 214/16,
 17.6; 198/65, 66, 68, 69, 72, 155, 185, 188;
 119/52, 56

[56] References Cited
 UNITED STATES PATENTS
 3,478,723 11/1969 Berg............................. 198/68X

| 1,629,991 | 5/1927 | Budd et al...................... | 214/17X |
| 3,435,967 | 4/1969 | Sackett........................... | 214/17 |
| 3,446,371 | 5/1969 | Nicolas............................ | 214/17 |

*Primary Examiner*—Robert G. Sheridan
*Attorney*—Don M. Bradley

ABSTRACT: Material such as feed is transported by a conveyor and selectively delivered to either of two receiving stations by a diverter which is shiftable between a pair of delivery positions. Structure for discharging the material from the conveyor into the diverter moves with the latter as the diverter is advanced back and forth along the conveyor between spaced limits of travel by a drive therefor. Limit switches may be selectively conditioned by the operator for activation in response to the arrival of the moving diverter and cooperate with a releasable coupling between the structure and the diverter to enable the drive to shift the diverter from one delivery position to another as the diverter reverses its direction of travel.

PATENTED DEC 22 1970

INVENTORS.
Gerald L. Harper
Wesley J. Bachman

BY *Schmidt, Johnson, Hovey,
William & Bradley*
ATTORNEYS.

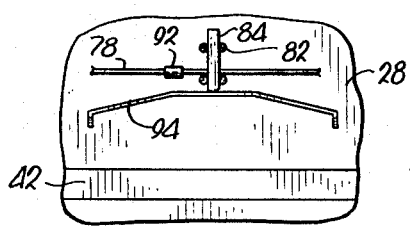
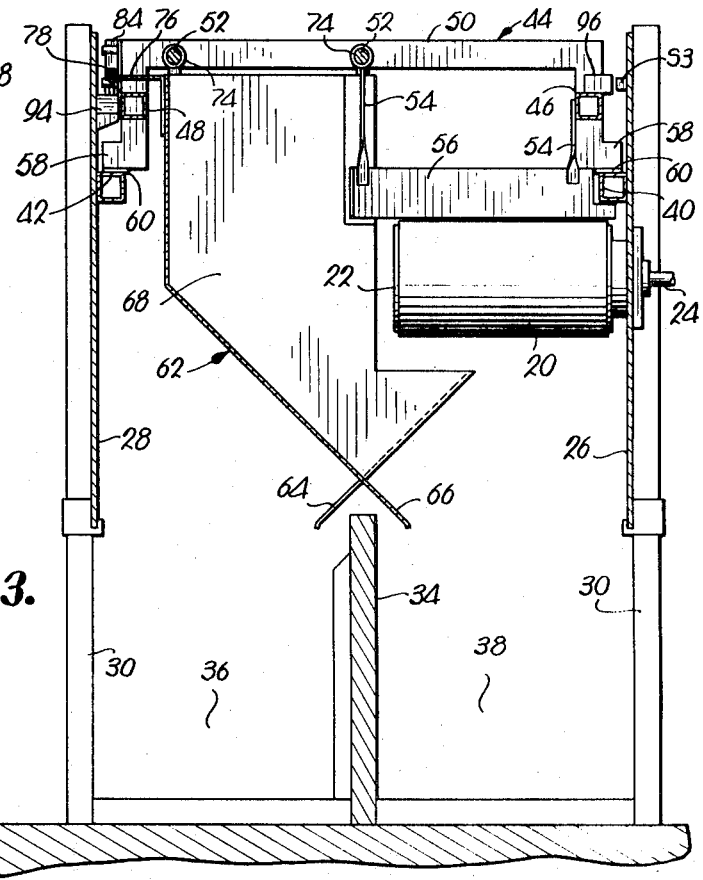

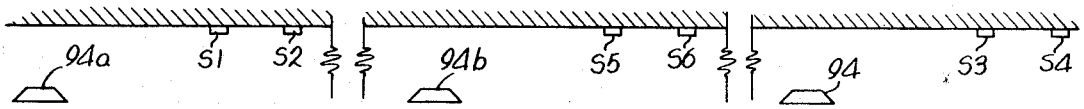
Fig.10.
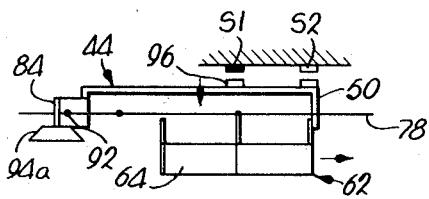
Fig.11.
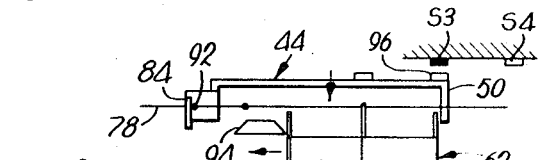
Fig.12.
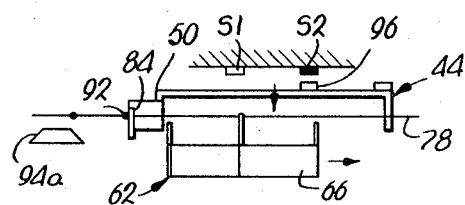
Fig.15.
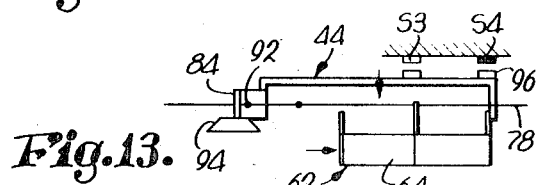
Fig.13.
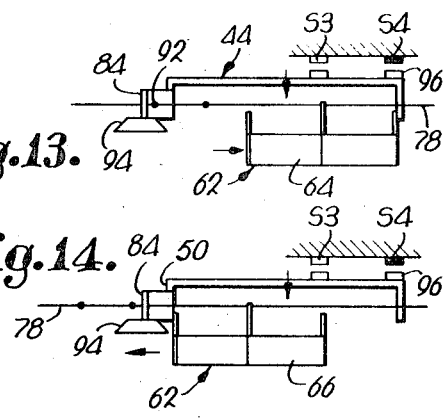
Fig.14.
Fig.16.
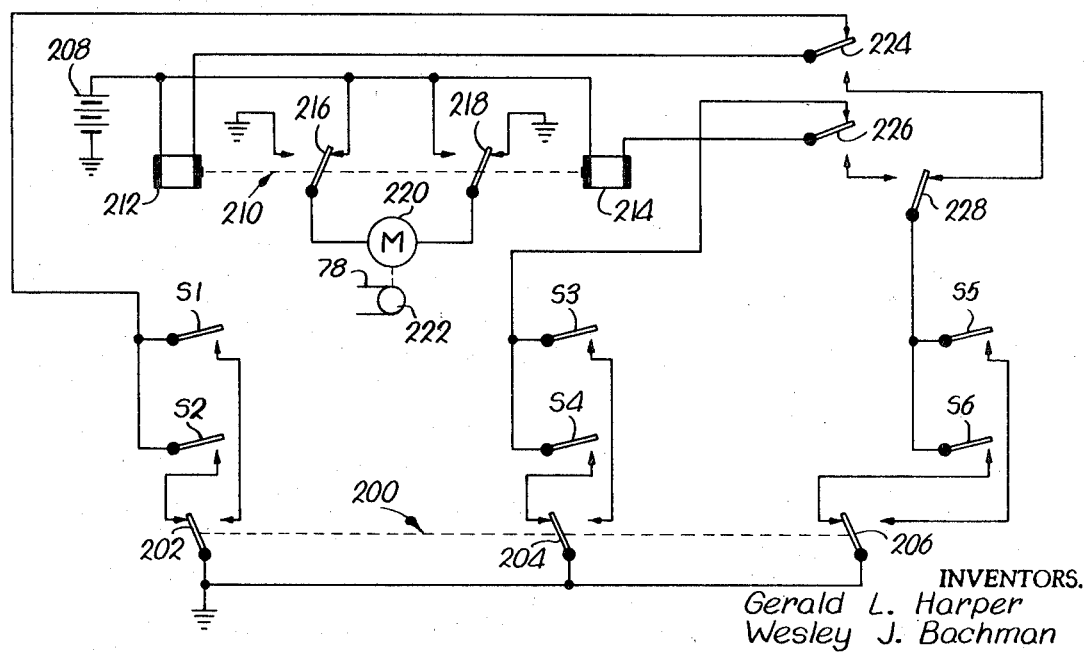
INVENTORS.
Gerald L. Harper
Wesley J. Bachman
BY Schmidt, Johnson, Hovey, Williams & Bradley
ATTORNEYS.

FEED CONVEYOR

In feed lots the use of conveyors to resupply feed bunks greatly reduces the manpower requirements for operation. However, in order to efficiently resupply a bunk that is common to several pens or lots, it is desired that some means be provided to selectively divert the feed from the conveyor into either side of the bunk, depending on feeding requirements. Furthermore, it is oftentimes desired to restock only a particular longitudinal section of the bunk that may, for example, feed a given pen, in which case discharge of feed from the conveyor must be limited to only that particular section of the bunk, in contrast to delivery of feed uniformly along the entire length thereof.

It is, therefore, the primary object of this invention to provide material handling apparatus capable of selectively delivering material to either of two receiving stations as the material is discharged from a conveyor in a pass traversing the path of travel of the conveyor.

As a corollary to the foregoing object, it is an important aim of the instant invention to provide apparatus as aforesaid which is selectively operable to limit the length of the material-discharging pass to effect delivery of material to only a predetermined section of the selected receiving station, in order that the apparatus may be employed to deliver the material to either the entire station or a preselected section or sections thereof in accordance with operational requirements.

Another important object of the invention is to provide such an apparatus in which a selective diverter is employed for material delivery and wherein the drive for the diverter also automatically causes the same to change from one delivery position to another at the command of the operator.

Furthermore, it is an important object of this invention to provide apparatus as aforesaid which is simple in design and relatively economical to manufacture, maintain and operate, and which is especially suited to feed lot operations but equally well adapted to other material-handling applications requiring the selective delivery of material from a conveyor discharged in successive passes.

In the drawings:

FIG. 3 is a cross-sectional view taken along line 3–3 of FIG. 2;

FIG. 4 is a detail view of one of the control ramps taken in a vertical plane through the latch holder of the diverter control;

FIG. 6 is an enlarged, vertical sectional view taken along line 6–6 of FIG. 2 and showing the latch in elevation;

FIG. 7 is a vertical sectional view taken along line 7–7 of FIG. 6;

FIG. 8 is a fragmentary, side view of an alternative form of the invention diagrammatically illustrating a tray-type conveyor in conjunction with the diverter;

FIG. 9 is an end view of the diverter and associated structure shown in FIG. 8;

FIG. 10 is a diagrammatic representation showing the relative locations of the various limit switches and latch release ramps;

FIGS. 11–15 are diagrammatic views illustrating the operation of the apparatus; and FIG. 16 is an electrical schematic diagram of a simplified, exemplary control circuit for the apparatus.

Figure 1:
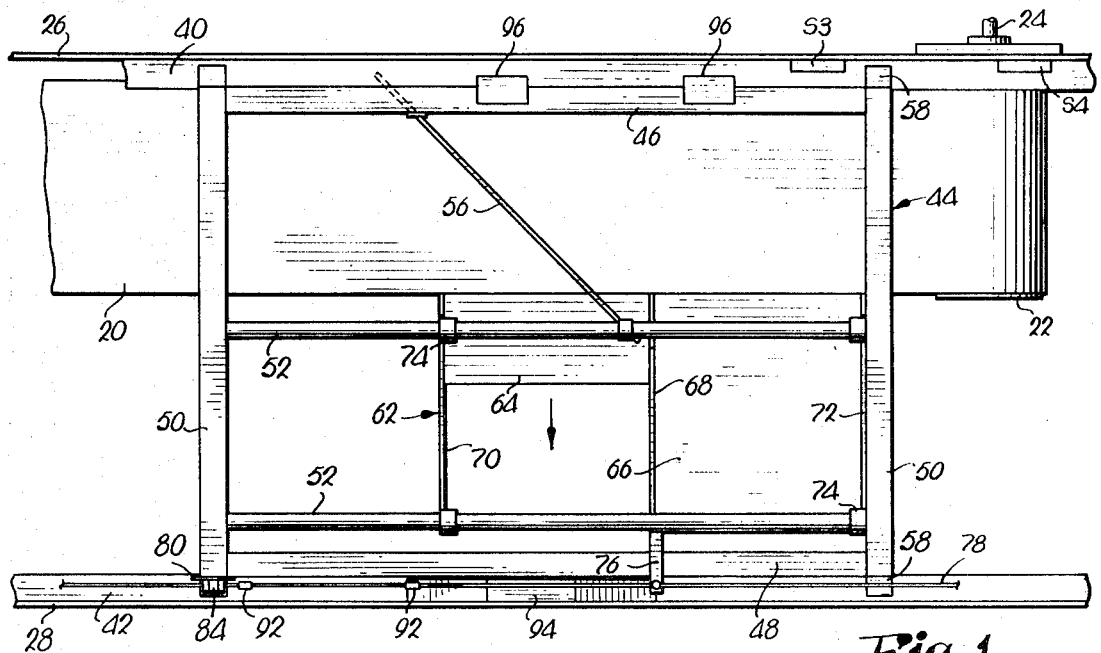
FIG. 1 is a fragmentary, top plan view of a belt conveyor and discharge and delivery means of the instant invention.

Referring to FIGS. 1–7, a belt conveyor is fragmentarily shown having an endless belt 20 trained around a roller 22 which is rigid with a drive shaft 24. The roller 22 is mounted by a journal on one sidewall 26 of the conveying apparatus, the sidewall 26 and an opposing sidewall 28 being supported by standards 30 which would be spaced along each side of the structure. As is clear in FIG. 3, a feed bunk 32 is disposed beneath the conveyor belt 20, the bunk 32 being provided with an upstanding divider 34 which extends longitudinally thereof. Thus, the bunk 32 is divided into a pair of laterally spaced feeding stations or troughs 36 and 38, the latter trough 38 being illustrated as directly beneath the conveyor belt 20.

The standards 30 support a pair of spaced, elongated horizontal rails 40 and 42, the latter being illustrated as box members extending along respective sidewalls 26 and 28. The rails 40 and 42 support a frame 44 comprising a pair of side members 46 and 48, a pair of crossmembers 50, and a pair of spaced rods 52 extending in parallelism with conveyor belt 20 and interconnecting the cross members 50. A pair of support legs 54 depend from the inner rod 52 and the side member 46 and carry a scraper blade 56 which is disposed at approximately a right angle with respect to conveyor belt 20 and in overlying engagement therewith.

Figure 2:
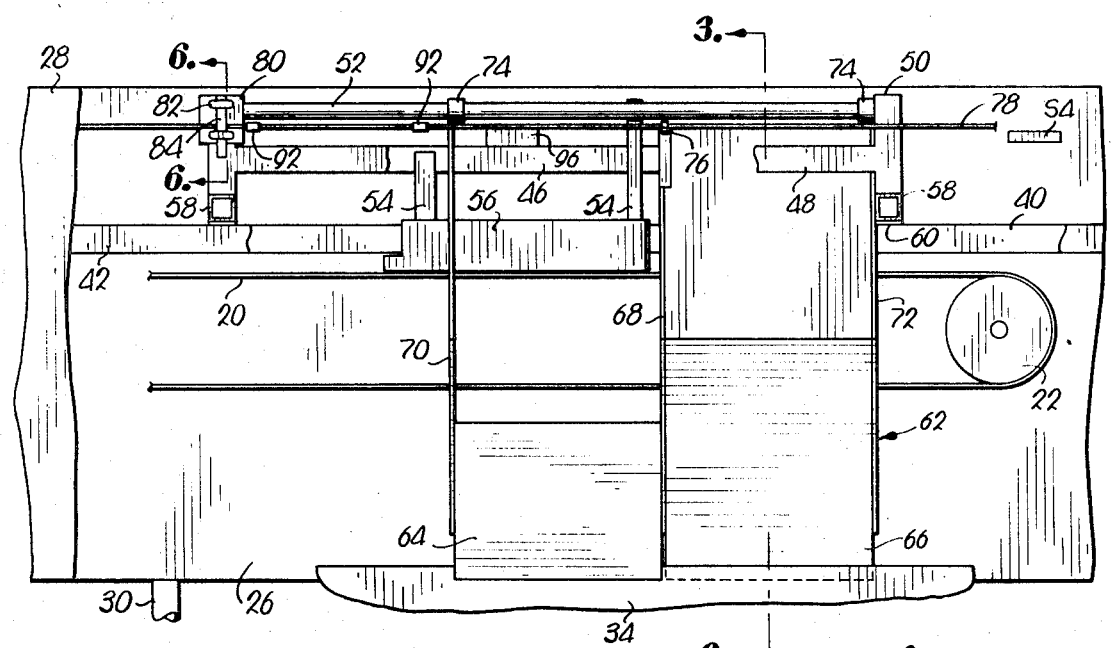
FIG. 2 is a side elevational view of the apparatus shown in FIG. 1.
Figure 5:
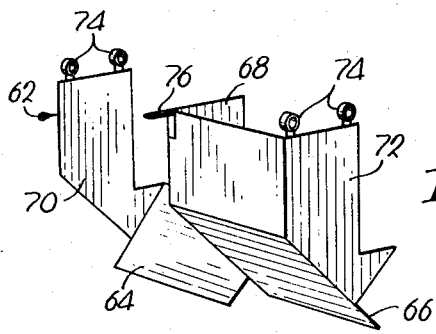
FIG. 5 is a perspective view of the diverter on a reduced scale.

Each of the crossmembers 50 is formed with a pair of opposed, depending, outwardly projecting feet 58 having antifriction pads 60 thereon resting upon respective rails 40 and 42, as is clear in FIGS. 2 and 3. A diverter broadly denoted 62 is shiftable carried by the rods 52 and comprises a pair of delivery sections having oppositely facing inclines or slides 64 and 66. The diverter 62 is compartmentalized by a center partition 68 between a pair of end walls 70 and 72 to form the two sections, the slide 64 being disposed between center partition 68 and end wall 70 with the slide 66 thus disposed between the center partition 68 and the end wall 72. A pair of eyes 74 are secured to the upper edges of each of the end walls 70 and 72 and receive respective rods 52 for sliding movement of the diverter 62 therealong. A bracket 76 projects laterally from the diverter 62 for the purpose of providing a connection for a pull line in the form of a drive cable 78 spaced above the rail 42.

A plate 80 is secured to the end of one of the crossmembers 50 adjacent sidewall 28 for the purpose of mounting a pair of vertically spaced retaining straps 82 which embrace an elongated, upright latch 84. With particular reference to FIGS. 6 and 7, it may be seen that the latch 84 resembles a clothespin in appearance and has a longitudinal slot 86 therein communicating with its lower end, thereby presenting a pair of spaced legs 88. The upper end of the slot 86 is reduced in width and communicates with a pair of opposed recesses 90, each configured to complementally receive either of a pair or buttonlike stops 92 attached to the cable 78. The stops 92 are cylindrical in configuration and thus are readily guided by the outer, frustoconical portions of the recesses 90 into the cylindrical internal bore portions thereof communicating with slot 86, as may be seen most clearly in FIG. 7. A ramp 94 (FIGS. 1 and 4) is secured to the inner surface of sidewall 28 above the rail 42 and is engageable with the lower end of the latch 84 during movement of the diverter 62 and the scraper 56 for control purposes to be discussed hereinafter. As will be subsequently explained with respect to FIG. 10, three ramps 94, 94a and 94b are employed at different locations along the path of travel of the scraper frame 44.

As may be seen in FIGS. 1 and 3, a pair of magnetic reed switches S3 and S4 are mounted on the inner surface of sidewall 26 above the rail 40, a pair of permanent magnets 96 being carried by the side member 46 of frame 44. The limit switches S3 and S4 serve as sensors and are horizontally spaced from each other a distance equal to the spacing between the two permanent magnets 96. These limit switches and magnets are also employed in the control of the apparatus and, as illustrated diagrammatically in FIG. 10, additional magnetic reed limit switches S1, S2, S5 and S6 are provided.

Referring to the alternative form of the invention illustrated in FIGS. 8 and 9, a tray-type conveyor 98 is shown having a shiftable tray support 100 disposed in underlying relationship to individual trays 102 of the lower stretch of conveyor 98. Each of the trays 102 has a pivotal axis 104 adjacent one end thereof, the opposite end of the tray being normally disposed in overlying relationship to the proximal end of an adjacent tray 102. Thus, the trays 102 mutually support one another unless the support 100 is removed to dump the contents of the trays 102 in domino fashion.

The diverter 162 in the alternative embodiment is similar to the diverter of FIGS. 1—7, and has a pair of generally oppositely facing, inclined slides 164 and 166. The diverter 162 is pulled by a drive cable 178 having a pair of spaced stops 192 thereon, as in the previous embodiment. The latch 184 and associated parts are identical to that as shown in FIGS. 6 and 7, and the diverter 162 is slidable upon a pair of rods 152 carried by a frame 144. Since the shiftable support 100 is employed to control the discharge of material from the trays 102, the support 100 is mounted on the frame 144, the latter having crossmembers 150 provided with feet 158 which ride on rails 140 and 142 in the same manner as described above with respect to the first embodiment.

Referring to the exemplary control circuitry illustrated in FIG. 16, the various limit switches S1—S6 are shown schematically as normally open, single-pole switches. A diverter position switch 200 has three-ganged poles 202, 204 and 206 that are connected to the return side or negative terminal of a DC power source 208, as illustrated by the ground notation. A latch relay 210 is employed and comprises a pair of coils 212 and 214 on a common armature operating a pair of single-pole relay switches 216 and 218. A reversible DC motor 220 is connected to the poles of the two switches 216 and 218, the output shaft thereof being diagrammatically illustrated as coupled with a drive pulley 222 having the cable 78 trained therearound. A pair of single-pole, double-throw limit selecting switches 224 and 226 are provided, together with a single-pole, double-throw switch 228 associated with limit switches S5 and S6 for a purpose to be discussed hereinafter.

OPERATION

Referring to FIGS. 1—7 and 10—16, it is assumed that it is initially desired to deliver feed to the trough 36 of bunk 32 along the entire length thereof. It will be appreciated that ramp 94a and limit switches S1 and S2 are appropriately positioned above the left end of bunk 32 which is not visible in the FIGS. The locations of ramp 94 and limit switches S3 and S4 are illustrated diagrammatically in FIG. 10 and shown in FIGS. 1 and 3. The description of operation will commence with the frame 44 and diverter 62 located at their left limit of movement, which would be a location above the left end of the bunk 32. This is depicted in FIG. 11 where the downwardly directed arrow represents the discharge of feed by scraper 56 from the belt 20 onto the slide 64.

In FIG. 11, the diverter 62 and the frame 44 (carrying scraper 56) have just completed a pass over the length of the bunk 32, during which time feed was continuously discharged into the trough 36. This occurred since the upper stretch of conveyor belt 20 moves to the right and had previously transported a supply of feed from the hopper end of the conveyor into overlying relationship to bunk 32, such feed being scraped from belt 20 as the scraper blade 56 advanced to the left along the length of the conveyor. (The hopper end of the conveyor is the left end thereof which is not shown in the FIGS.) It is now, therefore, necessary to reverse the direction of movement of diverter 62 and frame 44 to commence rightward movement thereof back toward the right end of the bunk 32.

This occurs automatically since the diverter position switch 200, for delivery from slide 64, has its poles 200—206 in engagement with the right-hand contacts thereof. Thus, only limit switch S1 may be activated to closed position by the presence of the first magnet 96 coming into close proximity thereto. (Limit switch activation is illustrated in the diagrammatic views of FIGS. 11—15 by the solid block representations.) When S1 closes, relay coil 212 is energized by a circuit through the upper contact of limit selecting switch 224, the latter being the left limit selector and illustrated in a position which selects limit switches S1 or S2 as defining the left limit of movement of the frame 44 and diverter 62. If the pole of switch 224 were in engagement with the lower switch contact, either limit switches S5 or S6 would define the left limit. Similarly, selector switch 226 selects the right-hand limit of movement and is shown in a position selecting either limit switch S5 or S6 as the right-hand limit. The switch 228 is employed to prevent the possibility of inadvertently selecting the same limit switch (either S5 or S6) for both left and right limits.

When S1 closes to effect energization of relay coil 212, the poles of relay switches 216 and 218 shift into engagement with their left-hand contacts to reverse the polarity of the connections to motor 220. This reverses the direction of movement of cable 78, the latter being a continuous cable trained around a drive pulley 222 (illustrated in FIG. 16) and an idler pulley which is not shown. Prior to reversing the direction of movement of the cable 78, the left stop 92 was retained by latch 84 to provide a coupling between frame 44 and diverter 62 during leftward movement thereof. However, with reversal of the direction of movement of the cable 78, the left stop 92 separates from the latch 84 a short distance limited by engagement of the right end of diverter 62 with the right crossmember 50 of frame 44. Thus, as is clear in FIG. 11, the two units 44 and 62 will now move to the right in unison.

At the right limit, the lead magnet 96 moves into close proximity to limit switch S3, whereupon the latter closes to energize relay coil 214 by a circuit through the limit selecting switch 226. It should be understood that relay coil 212 was previously deenergized as switch S1 reopened upon movement of the units away from the left limit, but the relay switches 216 and 218 remained latched against their left contacts. Therefore, energization of relay coil 214 shifts the relay switches 216 and 218 to their right-hand contacts to reverse the connections to the motor 220. When this occurs, the cable 78 begins movement to the left and reengages the left stop 92 within the latch 84 as the right end of the diverter 62 and the right frame crossmember 50 separate a short distance. The units now move back to the left so that scraper 56 will again discharge feed from the conveyor belt 20, the latter having advanced to the right with the units with a fresh load of feed.

The lost motion at each limit as the diverter 62 changes its direction of movement is necessary at the left limit in order to disengage the left stop 92 from the latch 84. Referring to FIG. 7, it may be seen that the stop 92 must be withdrawn from the corresponding recess 90 in order for the latch 84 to shift upwardly clear of the stops 92 when the bottom end of the latch 84 engages one of the ramps 94, 94a or 94b. The importance of this is illustrated in FIG. 13, where the initiation of a change in the position of diverter 62 is depicted. In FIG. 13 it is assumed that the operator now desires to load feed into the other trough 38 and, for this purpose, the feed must be discharged onto the slide 66. Thus, the operator actuates the diverter position selector switch 200 to return the poles 202—206 thereof to the positions illustrated in FIG. 16. Now movement of the units is under the control of limit switches S2 and S4; therefore, when the units approach the new right limit as in FIG. 13, movement continues until the lead magnet 96 moves into close proximity to switch S4. At this time the latch 84 has moved onto ramp 94 to raise the latch 84 clear of the cable 78, i.e., the cable 78 now extends between the legs 88 in the portion of the slot 86 of maximum width. Therefore, the stops 92 can now pass freely between the legs 88 of the latch 84 as the cable 78 begins leftward movement upon energization of relay coil 214 by the closure of limit switch S4. This uncouples the two units until the left end of the diverter 62 moves into engagement with the left frame crossmember 50 as shown in FIG. 14. The point of discharge of the feed from the conveyor is now aligned with the slide 66.

FIG. 15 depicts the operation of the apparatus at the new left limit established by the limit switch S2. When switch S2 closes in response to the presence of the lead magnet 96, relay coil 212 is energized to shift the relay contacts and reverse the drive as discussed above with respect to the closure of switch S1. Rightward movement of the cable 78 displaces the diverter 62 a short distance with respect to the frame 44 to bring the right stop 62 into engagement with latch 84. The right stop 92 is thus retained by the latch 84 to form a drive coupling between the two units for rightward movement thereof in unison. If it is subsequently desired to again position the diverter 62 for delivery from its slide 64, this is accomplished at the left limit by simply operating the position selector switch 200 to condition S1 for activation and remove S2 from the circuitry. The units would then continue leftward travel until the lead magnet 96 moves into close proximity to switch S1, whereupon the drive would reverse and the units would assume the positions shown in FIG. 11 where the drive coupling for rightward movement is an abutment between diverter 62 and the right frame member 50. This is accomplished since the latch 64 is now permitted to ride up upon the ramp 94a as the units terminate their leftward movement, during which time the right-hand stop 92 is disengaged from the latch 84 as in FIG. 14. Thus, the latch 84 is free to shift upwardly clear of the stops 92, permitting the same to pass between the legs 88 thereof as the cable 78 shifts to the right.

With reference to FIG. 10, it may be appreciated that the latch 84 will pass over the intermediate ramp 94b as the two units 44 and 62 reciprocate between left- and right-hand limits established by switches S1 and S3 or S2 and S4. It is significant to note, however, that the latch 84 will not release upon engagement with the ramp 94b because the respective stop 92 is captured within the corresponding recess 90 and follows the movement of the latch 84. In order for the latch 84 to release and clear the stops 92, the latter must be disengaged from the latch 84 as depicted, for example, in FIG. 13.

Assuming that it is desired to deliver feed to only a preselected stretch of the bunk 32, limit switch S5 or S6 is utilized by appropriate positioning of the limit selecting switches 224 and 226. Manifestly, additional pairs of limit switches and associated ramps may be interposed along the path of travel of the units 44 and 62 as may be desired to divide the bunk 32 into longitudinal sections that may be selectively fed.

Operation of the alternative form of the invention shown in FIGS. 8 and 9 is the same as discussed above with respect to reciprocation between desired limits and the selection of a particular diverter slope 164 or 166 for feed delivery. The only difference is in the manner of discharging feed from the conveyor 98 into the diverter 162, such being effected by movement of the support 100 leftwardly beneath the trays 102. The lower stretch of the conveyor 98 moves to the right and the trays 102 are filled at the left end thereof (not shown), the lead tray 102 being held in a horizontal attitude by the support 100 as the latter follows the lead tray 102 during rightward advancement thereof. When the support 100 reaches the desired right-hand limit, the drive for the diverter 162 and the frame 144 carrying support 100 reverses to cause the trays 102 to sequentially move to their dumping positions over the selected section of the diverter 162. This occurs in domino fashion as the two units advance to the left, whereupon the trays 102 refill after the left limit is reached and the drive reverses to again shift frame 144 and diverter 162 back to the right.

We claim:
1. Material handling apparatus comprising:
 a conveyor for transporting material along a predetermined path of travel;
 structure operably associated with said conveyor and movable along said path for discharging said material from the conveyor as the structure traverses said path;
 material delivery means movable with said structure for receiving the material discharged from the conveyor and delivering the material to either a first receiving station extending generally alongside the conveyor or a second receiving station spaced laterally from said first station,
 said material delivery means being shiftable with respect to said structure between a first position for said delivery of the material to said first station and a second position for said delivery of the material to said second station;
 control means operably coupled with said material delivery means for shifting the latter from either one of said positions to the other position thereof, whereby either of said stations may be selected for delivery of said material thereto, said control means having means for coupling said structure to said material delivery means for movement in unison when the material delivery means is in either of said positions; and
 said control means being operable to shift said material delivery means along said conveyor to, in turn, move said structure along said path.

2. Apparatus as claimed in claim 1, wherein said control means is operable to shift said material delivery means back and forth along said conveyor between spaced limits of travel to, in turn, reciprocate said structure.

3. Apparatus as claimed in claim 2, said control means including sensing means adjacent said limits and responsive to the arrival of said material delivery means for reversing the direction of travel thereof.

4. Apparatus as claimed in claim 3, said control means further including selectively operable means coupled with said sensing means for automatically effecting said shifting of the material delivery means from either one of said positions to the other position thereof as the material delivery means reverses its direction of travel.

5. Apparatus as claimed in claim 3, said control means further including additional sensing means between a pair of said limits and operable to reverse the direction of travel of said material delivery means at a location between said pair of limits in response to the arrival of the material delivery means at said location, and means for selectively conditioning the sensing means at each of said pair of limits and said additional sensing means for activation upon the arrival of said material delivery means to cause the latter to reciprocate either between one and the other of said pair of limits, said one limit and said location, or said location and said other limit.

6. Apparatus as claimed in claim 1, said control means including a reversible drive for said material delivery means for shifting the latter back and forth along said conveyor between spaced limits of travel, a first pair of sensors adjacent a first pair of said limits for alternately reversing said drive in response to the arrival of said material delivery means at a respective limit, a second pair of sensors adjacent a second pair of said limits spaced from said first pair of limits along the patch of movement of said material delivery means for alternately reversing said drive in response to the arrival of the material delivery means at a respective limit, selectively operable means coupled with said sensors for selectively conditioning either said first pair of sensors or said second pair of sensors for activation upon said arrival of the material delivery means, and releasable means coupling said structure to said material delivery means for movement in unison and with said material delivery means in said first position when said first pair of sensors are conditioned for activation and, upon conditioning of said second pair of sensors for activation, releasing and recoupling said structure to said material delivery means with the latter in said second position as the material delivery means reverses its direction of travel at one of said second pair of limits.

7. Apparatus as claimed in claim 6:
 said drive including a pull line connected with said material delivery means; and
 said releasable means including a stop on said line and a shiftable latch device on said structure engageable with said stop when the material delivery means is in said first position.

8. Apparatus as claimed in claim 7:
 said releasable means further including a second stop on said line for engagement with said latch device when said material delivery means is in said second position; and
 said control means having means along the path of movement of the material delivery means disposed for engagement with said latch device to release the latter when control of the reversal of movement of the material delivery means is transferred from said first pair of sensors to said second pair of sensors by said selectively operable means.

9. Apparatus as claimed in claim 7:

said structure being provided with a frame having a pair of spaced members;

said stop moving into locking engagement with said latch device upon movement of said material delivery means in one direction when the material delivery means is in said first position, and said material delivery means undergoing sufficient displacement upon reversal of its direction of travel to disengage the stop from the latch device and shift into engagement with one of said members to move the structure therewith;

said releasable means further including a second stop on said line for engagement with said latch device when said material delivery means is in said second position;

said second stop moving into locking engagement with said latch device upon movement of said material delivery means in the opposite direction when the material delivery means is in said second position, and said material delivery means undergoing sufficient displacement upon reversal of its direction of travel to disengage the second stop from the latch device and shift into engagement with the other of said members to move the structure therewith; and said control means having means along the path of movement of the material delivery means disposed for engagement with said latch device to shift the latter into clearing relationship to said stops when control of the reversal of movement of the material delivery means is transferred from either one of said pairs of sensors to the other pair thereof by said selectively operable means and said stops are disengaged from said latch device, whereby to permit the line to shift the material delivery means relative to the structure between said positions thereof.

10. Apparatus as claimed in claim 6:

said drive being electrically controlled and each of said sensors comprising a magnetically responsive switch; and said control means further including operating circuitry coupling each of said switches with said drive, and a pair of spaced magnets carried by said structure for actuating said switches.

11. Selective drive and coupling apparatus comprising:

a first unit movable along a predetermined path of travel;

a second unit movable with said first unit and shiftable with respect thereto between first and second positions;

a reversible drive connected with said second unit for shifting the latter back and forth along with said path between spaced limits of travel;

a first pair of sensors adjacent a first pair of said limits and coupled with said drive for alternately reversing the latter in response to the arrival of said second unit at a respective limit;

a second pair of sensors coupled with said drive and disposed adjacent a second pair of said limits spaced from said first pair of limits along said path for alternately reversing said drive in response to the arrival of said second unit at a respective limit;

selectively operable means coupled with said sensors for selectively conditioning either said first pair of sensors or said second pair of sensors for activation upon said arrival of the second unit; and releasable means coupling said first unit to said second unit for movement in unison and with said second unit in said first position when said first pair of sensors are conditioned for activation and, upon conditioning of said second pair of sensors for activation, releasing and recoupling said first unit to said second unit with the latter in said second position as the second unit reverses its direction of travel at one of said second pair of limits.

12. Apparatus as claimed in claim 11:

said drive including a pull line connected with said second unit; and said releasable means including a stop on said line and a shiftable latch device on said first unit engageable with said stop when said second unit is in said first position.

13. Apparatus as claimed in claim 12:

said releasable means further including a second stop on said line for engagement with said latch device when said second unit is in said second position; and means along said path disposed for engagement with said latch device to release the latter when control of the reversal of movement of said second unit is transferred from said first pair of sensors to said second pair of sensors by said selectively operable means.

14. Material handling apparatus comprising:

a conveyor having a series of trays for transporting material along a predetermined path of travel, each tray being movable between a material dumping disposition and a material carrying disposition in supporting relationship to an adjacent tray;

structure operably associated with said conveyor and movable along said path for discharging said material from the conveyor as the structure traverses said path;

material delivery means movable with said structure for receiving the material discharged from the conveyor and delivering the material to either a first receiving station extending generally alongside the conveyor or a second receiving station spaced laterally from said first station, said delivery means comprising a diverter having a pair of material delivery sections;

said material delivery means being shiftable with respect to said structure between a first position for said delivery of the material to said first station and a second position for said delivery of the material to said second station;

said structure discharging the material into one of the sections when the material delivery means is in said first position, and discharging said material into the other of said sections when the material delivery means is in said second position; and control means operably coupled with said material delivery means for shifting the latter from either one of said positions to the other position thereof, whereby either of said stations may be selected for delivery of said material thereto, said structure including a support underlying said trays and movable therebeneath for dumping the trays in succession in domino fashion to effect the discharge of said material from the conveyor into said diverter.